United States Patent
Grenci

(10) Patent No.: US 12,390,971 B2
(45) Date of Patent: Aug. 19, 2025

(54) PROCESS AND SYSTEM FOR BLENDING A PLASTICIZER WITH A POLYSACCHARIDE ESTER POLYMER

(71) Applicant: Celanese International Corporation, Irving, TX (US)

(72) Inventor: Joseph Grenci, Florence, KY (US)

(73) Assignee: Celanese International Corporation, Irving, TX (US)

( * ) Notice: Subject to any disclaimer, the term of this patent is extended or adjusted under 35 U.S.C. 154(b) by 187 days.

(21) Appl. No.: 18/096,907

(22) Filed: Jan. 13, 2023

(65) Prior Publication Data
US 2023/0226735 A1 Jul. 20, 2023

Related U.S. Application Data

(60) Provisional application No. 63/299,596, filed on Jan. 14, 2022.

(51) Int. Cl.
| | | |
|---|---|---|
| B29C 48/16 | (2019.01) | |
| B29C 48/00 | (2019.01) | |
| B29C 48/285 | (2019.01) | |
| B29K 1/00 | (2006.01) | |
| B29K 105/00 | (2006.01) | |
| C08L 1/12 | (2006.01) | |

(52) U.S. Cl.
CPC ............ B29C 48/16 (2019.02); B29C 48/022 (2019.02); B29C 48/288 (2019.02); C08L 1/12 (2013.01); B29K 2001/12 (2013.01); B29K 2005/00 (2013.01); B29K 2105/251 (2013.01); C08L 2310/00 (2013.01); C08L 2666/34 (2013.01)

(58) Field of Classification Search
CPC ..... B29C 48/288; B29C 48/022; B29C 48/05; C08L 2310/00; C08L 1/12; B29K 2001/12
See application file for complete search history.

(56) References Cited

U.S. PATENT DOCUMENTS

| | | |
|---|---|---|
| 5,288,318 A | 2/1994 | Mayer et al. |
| 8,851,084 B2 | 10/2014 | Lemmouchi et al. |
| 2006/0104933 A1* | 5/2006 | Bell ........... A61K 8/731 424/70.13 |

(Continued)

FOREIGN PATENT DOCUMENTS

| | | | | |
|---|---|---|---|---|
| CN | 105504359 A | * | 4/2016 | ........... C08J 3/12 |
| WO | WO-2010005242 A2 | * | 1/2010 | ........... C08J 5/18 |

OTHER PUBLICATIONS

PCT Search Report Corresponding to Application No. PCT/US2023/010777 on Apr. 25, 2023.

*Primary Examiner* — Nahida Sultana
(74) *Attorney, Agent, or Firm* — Kilpatrick Townsend & Stockton LLP

(57) ABSTRACT

A process is disclosed for combining a polysaccharide ester polymer with one or more plasticizers in a way that produces a homogeneous blend. The polysaccharide ester polymer can be in the form of particles and fed to a heated extruding device. Separate quantities of plasticizer can then be combined with the polysaccharide ester polymer particles as they are conveyed through the extruding device. Through the process of the present disclosure, a homogenous blended product can be formed that can then be used to form various articles including fibers, films, and molded articles.

20 Claims, 1 Drawing Sheet

(56) References Cited

U.S. PATENT DOCUMENTS

| | | | |
|---|---|---|---|
| 2010/0331452 A1* | 12/2010 | Tsou | B29B 7/726 |
| | | | 525/178 |
| 2011/0201731 A1* | 8/2011 | Korzhenko | C08J 3/203 |
| | | | 524/297 |
| 2013/0273287 A1 | 10/2013 | Luo et al. | |
| 2017/0009056 A1* | 1/2017 | Parker | C08K 5/527 |
| 2019/0264006 A1 | 8/2019 | Argoud et al. | |

* cited by examiner

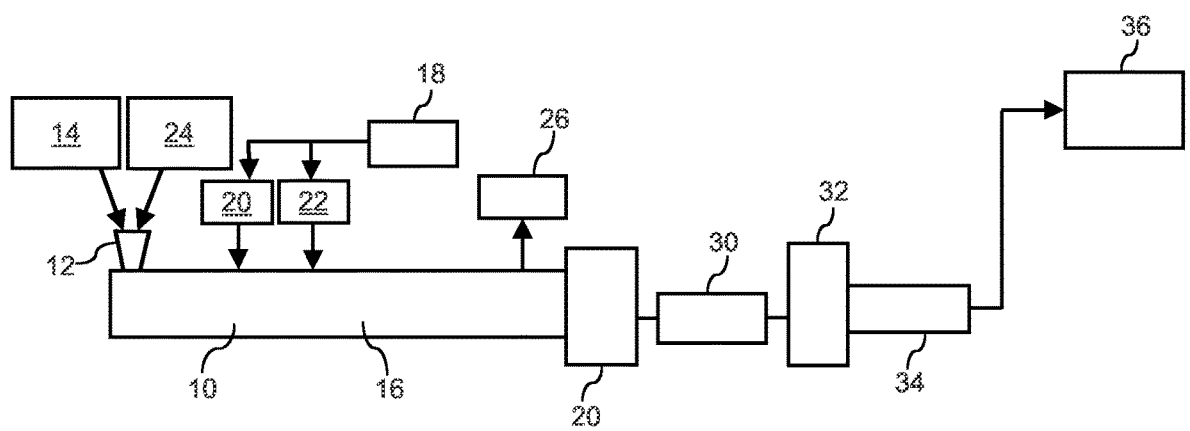

PROCESS AND SYSTEM FOR BLENDING A PLASTICIZER WITH A POLYSACCHARIDE ESTER POLYMER

RELATED APPLICATIONS

The present application is based upon and claims priority to U.S. Provisional Patent Application Ser. No. 63/299,596, having a filing date of Jan. 14, 2022, which is incorporated herein by reference.

BACKGROUND

Each year, the global production of plastics continues to increase. Over one-half of the amount of plastics produced each year are used to produce plastic bottles, containers, drinking straws, and other single-use items. The discarded, single-use plastic articles, including plastic drinking bottles, are typically not recycled and end up in landfills. In addition, many of these items are not properly disposed of and end up in streams, lakes, and oceans around the world.

In view of the above, those skilled in the art have attempted to produce plastic articles made from biodegradable polymers. Many biodegradable polymers, however, lack the physical properties and characteristics of conventional polymers, such as polypropylene and/or polyethylene terephthalate.

Cellulose esters have been proposed in the past as a replacement to some petroleum-based polymers or plastics. Cellulose esters, for instance, are generally considered environmentally friendly polymers because they are recyclable, degradable and derived from renewable resources, such as wood pulp. Problems have been experienced, however, in melt processing cellulose ester polymers, such as cellulose acetate polymers. The polymer materials are relatively stiff and have relatively poor elongation properties. In addition, the melt temperature of cellulose ester polymers is close to the degradation temperature of the polymer, which requires careful control over temperatures during melt processing. Consequently, cellulose esters are typically combined with a plasticizer in order to improve the melt processing properties of the material. Adding a plasticizer lowers the melt temperature of the composition preventing degradation.

One problem that has been experienced in the past, however, is being able to quickly and efficiently combine a plasticizer with a cellulose ester for producing a homogeneous composition. For example, many plasticizers do not easily mix with the cellulose ester particles. Failure to receive proper mixing of the two components can result in molded articles containing imperfections and non-uniform properties. Thus, in the past, in order to improve blending of cellulose ester particles with plasticizers, the cellulose ester particles have been ground to very small sizes in order to increase surface area for contact with the plasticizer. Grinding the cellulose ester particles, however, not only can add significant costs to the overall process but can also make it hard to handle and process the small particles.

In still other embodiments, cellulose ester particles and a plasticizer were premixed and stored prior to processing in order to improve blending. Although premixing the two components can provide some improvements, the premixing step not only requires significant amounts of time but also a significant amount of storage space.

In view of the above, a need exists for an improved process for combining cellulose ester polymers with plasticizers.

SUMMARY

In general, the present disclosure is directed to a process for efficiently combining one or more plasticizers with a polysaccharide ester polymer in order to produce a homogenized polymer resin. The polysaccharide ester polymer, for instance, can be a cellulose ester polymer, such as a cellulose acetate. In one aspect, the plasticizer and cellulose ester polymer blend are extruded into strands, pellets, granules, or a powder. Through the process of the present disclosure, relatively great amounts of plasticizer can be incorporated into the cellulose ester polymer. The resulting cellulose ester polymer and plasticizer blend can then be formed into molded articles having uniform properties. Polymer articles made according to the present disclosure, for example, can have not only excellent mechanical properties, but can also have aesthetic appeal. The resulting polymer composition is well suited for producing polymer articles, such as beverage holders, other plastic containers, drinking straws, hot beverage pods, automotive parts, consumer appliance parts, packaging, and the like.

In one embodiment, for instance, the present disclosure is directed to a process for producing a polysaccharide ester polymer product, namely a cellulose ester polymer product. The process includes feeding polysaccharide ester polymer particles into a heated extruding device. The heated extruding device includes a heated barrel having a length. After the polysaccharide ester polymer particles have been heated in the extruding device, the process further includes combining the polysaccharide ester polymer particles with a first quantity of a first plasticizer within the extruding device to form a polysaccharide ester polymer particle and first plasticizer blend. The polysaccharide ester polymer particle and first plasticizer blend is then combined with a second quantity of a second plasticizer within the extruding device downstream from where the polysaccharide ester polymer particles were combined with the first plasticizer. In accordance with the present disclosure, a plasticized polysaccharide ester polymer product is then discharged from the heated extruding device. For instance, the product can be in the form of strands or pellets, which can then be ground into granules or a powder.

As described above, the polysaccharide ester polymer particles are combined with two quantities of plasticizer along the length of the heated barrel of the extruding device. In alternative embodiments, the polysaccharide ester polymer particles can be blended with further quantities of plasticizer as the polymer is conveyed through the extruding device. For instance, the polysaccharide ester polymer particles can be combined with a third quantity of a plasticizer, a fourth quantity of a plasticizer, or a fifth quantity of a plasticizer. For example, the heated barrel of the extruding device can include from about 2 to about 10 inlets for receiving a quantity of a plasticizer for combining with the polysaccharide ester polymer.

In one aspect, the first plasticizer combined with the polysaccharide ester polymer particles and the second plasticizer combined with the polysaccharide ester polymer particles can be the same or can be different plasticizers. In one embodiment, the first quantity of plasticizer combined with the polysaccharide ester polymer particles can be less than the second quantity of plasticizer combined with the polysaccharide ester polymer particles. For example, the weight ratio between the first plasticizer quantity and the second plasticizer quantity can be from about 1:1 to about 1:20, such as from about 1:2 to about 1:12, such as from about 1:2 to about 1:7. In one aspect, the first plasticizer is incorporated into the polysaccharide ester polymer product in an amount from about 2% to about 6% by weight while the second plasticizer is incorporated into the polysaccharide ester polymer product in an amount from about 2% to about 14% by weight.

The total amount of plasticizer incorporated into the polysaccharide ester polymer product can vary depending upon the particular application and the desired result. One or more plasticizers, for instance, can be incorporated into the product in an amount greater than about 5% by weight, such as in an amount greater than about 14% by weight, such as in an amount greater than about 18% by weight, such as in an amount greater than about 20% by weight, such as in an amount greater than about 22% by weight, such as in an amount greater than about 24% by weight, and generally in an amount less than about 40% by weight, such as in an amount less than about 30% by weight.

The polysaccharide ester polymer particles fed to the extruding device can optionally be pre-dried. The particles, for instance, can have a moisture content of less than about 8% by weight, such as less than about 6% by weight, such as less than about 4% by weight, such as less than about 2% by weight, such as less than about 1% by weight. In one embodiment, a portion of the polysaccharide ester polymer fed to the extruding device is pre-compounded with one or more additives. The one or more additives can comprise an antioxidant, a stabilizer, an organic acid, an oil, filler particles, glass fibers, a pigment, a bio-based polymer other than the cellulose ester, a biodegradable enhancer, or mixtures thereof.

As described above, the first plasticizer can be the same or different from the second plasticizer. Any suitable plasticizer can be combined with the polysaccharide ester polymer particles. In one embodiment, the plasticizer is a polyalkylene glycol, such as polyethylene glycol. Examples of other plasticizers include tris(clorisopropyl) phosphate, tris (2-chloro-1-methylethyl) phosphate, glycerin, monoacetin, triethyl citrate, acetyl triethyl citrate, a phthalate, an adipate, polyethylene glycol, triacetin, diacetin, trimethyl phosphate, triethyl phosphate, tributyl phosphate, triphenyl phosphate, triethyl-o-acetyl citrate, diethyl tartrate, ethyl o-benzoylbenzoate, n-ethyltoluenesulfonamide, o-cresyl p-toluenesulfonate, aromatic diol, a substituted aromatic diol, an aromatic ether, tripropionin, tribenzoin, glycerin esters, glycerol tribenzoate, glycerol acetate benzoate, a polyethylene glycol ester, a polyethylene glycol diester, di-2-ethylhexyl polyethylene glycol ester, a glycerol ester, diethylene glycol, polypropylene glycol, a polyglycoldiglycidyl ether, dimethyl sulfoxide, N-methyl pyrollidinone, propylene carbonate, a C1-C20 dicarboxylic acid ester, di-butyl maleate, di-octyl maleate, resorcinol monoacetate, catechol, catechol esters, phenols, epoxidized soy bean oil, castor oil, linseed oil, epoxidized linseed oil, difunctional glycidyl ether based on polyethylene glycol, an alkyl lactone, a phospholipid, 2-phenoxyethanol, acetylsalicylic acid, acetaminophen, naproxen, imidazole, triethanol amine, benzoic acid, benzyl benzoate, salicylic acid, 4-hydroxybenzoic acid, propyl-4-hydroxybenzoate, methyl-4-hydroxybenzoate, ethyl-4-hydroxybenzoate, benzyl-4-hydroxybenzoate, glyceryl tribenzoate, neopentyl dibenzoate, triethylene glycol dibenzoate, trimethylolethane tribenzoate, butylated hydroxytoluene, butylated hydroxyanisol, sorbitol, xylitol, ethylene diamine, piperidine, piperazine, hexamethylene diamine, triazine, triazole, pyrrole, and mixtures thereof.

The plasticized polysaccharide ester polymer product of the present disclosure can generally contain cellulose ester in an amount from about 15% to about 95% by weight, such as in an amount from about 60% to about 95% by weight. One or more plasticizers can be present in the product in an amount from about 3% to about 40% by weight, such as in an amount from about 3% to about 35% by weight.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 1 is one exemplary embodiment of a process flow diagram in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a process for improving the incorporation of one or more plasticizers into a polysaccharide ester polymer, such as a cellulose ester polymer. The present disclosure is also directed to products made from the process.

In one aspect, a pre-compounded product is produced that contains a substantially homogenous blend of a polysaccharide ester polymer, one or more plasticizers, in addition to one or more additives. The plasticized polysaccharide ester product can be used to mold all different types of articles. The plasticized polysaccharide ester product or cellulose ester product, for instance, may have improved melt processing properties and may produce molded products and articles with better and more uniform properties and characteristics.

The process of the present disclosure generally includes combining cellulose ester particles with two or more quantities of plasticizer as the cellulose ester particles are being heated into a molten state and fed through a heated extruding device. Combining the cellulose ester particles with two or more quantities of plasticizer as the cellulose ester polymer is moving through the extruder has been found to dramatically improve the ability of the cellulose ester particles and the one or more plasticizers to blend together and form a homogeneous composition. Of particular advantage, one or more additives can also be blended into the final product during the process.

Through the process of the present disclosure, the cellulose ester particles and the one or more plasticizers can be combined together in a single process step as the cellulose ester particles are being extruded. Consequently, the process of the present disclosure makes it unnecessary to pre-blend the one or more plasticizers with the cellulose ester particles prior to melt processing. In addition, the process of the present disclosure also makes it unnecessary to first grind the cellulose ester particles down to a smaller size prior to combining with the one or more plasticizers.

Through the process of the present disclosure, significant amounts of plasticizer can also be incorporated into the cellulose ester polymer product without problems experienced in the past with respect to phase separation and leaching. For instance, one or more plasticizers can be present in the cellulose ester polymer product in an amount generally from about 5% by weight to about 40% by weight. In one aspect, one or more plasticizers can be present in the product in an amount greater than about 10% by weight, such as in an amount greater than about 15% by weight, such as in an amount greater than about 18% by weight, such as in an amount greater than about 20% by weight, such as in an amount greater than about 22% by weight, such as in an amount greater than about 24% by weight, such as in an amount greater than about 26% by weight, such as in an amount greater than about 28% by weight.

The process of the present disclosure can also significantly improve the characteristics of molded articles made from the plasticized polymer. For example, in the past, plasticized cellulose ester particles were formed with insufficient mixing and the formation of gels in the exudate and product. The formation of gels during processing can not only affect in a negative way the physical properties of any resulting product but can also negatively affect the appearance of any product formed. Articles made according to the present disclosure, however, when tested according to the gel analysis test, can show dramatically low defect levels. Gel analysis, for instance, can be produced on films formed from the plasticized polymer product.

The gel analysis test can be conducted by an FSA-100 film surface analyzer commercially available from OCS GmbH of Witten, Germany. The film surface analyzer can include a 4096 pixel CMOS digital camera with a complementary metal oxide semiconductor sensor. The film surface analyzer can have a 50 micron nominal resolution and can include an LED lighting system that enables optimal defect detection in transparent, opaque and colored polymer films. Films can be tested according to the present disclosure at any suitable thickness, such as at a thickness of 25.4 microns. The FSA LID setting is set at 40. The parcel length is set at 102.4 mm and the parcel width is set at 80.00 mm. The parcel area is 8192.00 mm$^2$. 367 parcels are inspected and the inspection area is 3.006 m$^2$. The inspected length is 37.581 m. The levels are set at 40%-10%-. The other settings include gray value at 169, mean filter size at 50 (50), film speed at 7.01 m/min, exposure time at 0.013 ms, transparency/noise set at 98.88%/2.83%, X resolution set at 50 microns, and Y resolution set at 50 microns. The gel analysis test measures the number of defects per area and the size of the defects.

Films and articles made according to the present disclosure, for instance, can display defects having a size of 300 microns or greater of less than about 5,000 defects/m$^2$, such as less than about 3,500 defects/m$^2$, such as less than about 2,000 defects/m$^2$. Films and articles made according to the present disclosure can display defects having a size of 200 microns or greater in an amount less than about 25,000 defects/m$^2$, such as in an amount less than about 20,000 defects/m$^2$, such as in an amount of less than about 15,000 defects/m$^2$. Films and articles made according to the present disclosure can display defects having a size of 100 microns or greater in an amount less than about 70,000 defects/m$^2$, such as in an amount less than about 60,000 defects/m$^2$, such as in an amount of less than about 50,000 defects/m$^2$.

Films and articles made according to the present disclosure can have a total defect area of less than about 9,000 mm$^2$, such as less than about 8,000 mm$^2$, such as less than about 7,000 mm$^2$, such as less than about 6,000 mm$^2$, such as less than about 5,000 mm$^2$, such as less than about 4,000 mm$^2$, such as less than about 3,000 mm$^2$, such as less than about 2,000 mm$^2$.

The above gel analysis characteristics can lead to films and articles displaying excellent haze and transparency.

For example, polymer articles made according to the present disclosure can be measured for haze according to ASTM Test D1003 (2013). Haze can be measured using any acceptable instrument according to the ASTM Test including, for instance, a BYK Gardner Haze-Gard 4725 instrument. Haze can be measured on a test plaque, on a film made according to the present disclosure, or on the final thermoformed article. The test plaque can have any suitable thickness, such as 1 mm, 2 mm, 3 mm, or 4 mm. When any of the above samples are tested, the haze of the sample or article can generally be less than about 10%, such as less than about 8%, such as less than about 5%, such as less than about 3%, such as less than about 2%. In one aspect, the haze can be less than 1%, such as less than about 0.8%, such as less than about 0.5%, such as less than about 0.4%, such as less than about 0.3%, such as less than about 0.2%.

In general, any suitable polysaccharide ester polymer may be used in the process of the present disclosure, particularly any suitable cellulose ester polymer. In one aspect, the cellulose ester polymer can be a cellulose acetate, such as cellulose diacetate, cellulose triacetate, cellulose acetate propionate, cellulose acetate butyrate, and the like. In addition, various other modified cellulose esters may be used.

Cellulose acetate may be formed by esterifying cellulose after activating the cellulose with acetic acid. The cellulose may be obtained from numerous types of cellulosic material, including but not limited to plant derived biomass, corn stover, sugar cane stalk, bagasse and cane residues, rice and wheat straw, agricultural grasses, hardwood, hardwood pulp, softwood, softwood pulp, cotton linters, switchgrass, bagasse, herbs, recycled paper, waste paper, wood chips, pulp and paper wastes, waste wood, thinned wood, willow, poplar, perennial grasses (e.g., grasses of the *Miscanthus* family), bacterial cellulose, seed hulls (e.g., soy beans), cornstalk, chaff, and other forms of wood, bamboo, soyhull, bast fibers, such as kenaf, hemp, jute and flax, agricultural residual products, agricultural wastes, excretions of livestock, microbial, algal cellulose, seaweed and all other materials proximately or ultimately derived from plants. Such cellulosic raw materials are preferably processed in pellet, chip, clip, sheet, attritioned fiber, powder form, or other form rendering them suitable for further purification.

Cellulose esters suitable for use in the process of the present disclosure may, in some embodiments, have ester substituents that include, but are not limited to, $C_1$-$C_{20}$ aliphatic esters (e.g., acetate, propionate, or butyrate), functional $C_1$-$C_{20}$ aliphatic esters (e.g., succinate, glutarate, maleate) aromatic esters (e.g., benzoate or phthalate), substituted aromatic esters, and the like, any derivative thereof, and any combination thereof.

The cellulose acetate used in the process may be cellulose diacetate or cellulose triacetate. In one embodiment, the cellulose acetate comprises primarily cellulose diacetate. For example, the cellulose acetate can contain less than 1% by weight cellulose triacetate, such as less than about 0.5% by weight cellulose triacetate. Cellulose diacetate can make up greater than 90% by weight of the cellulose acetate, such as greater than about 95% by weight, such as greater than about 98% by weight, such as greater than about 99% by weight of the cellulose acetate.

In general, the cellulose acetate can have a molecular weight of greater than about 10,000, such as greater than about 20,000, such as greater than about 30,000, such as greater than about 40,000, such as greater than about 50,000. The molecular weight of the cellulose acetate is generally less than about 300,000, such as less than about 250,000, such as less than about 200,000, such as less than about 150,000, such as less than about 100,000, such as less than about 90,000, such as less than about 70,000, such as less than about 50,000. The molecular weights identified above refer to the number average molecular weight. Molecular weight can be determined using gel permeation chromatography using a polystyrene equivalent or standard.

In general, the cellulose ester polymer can have a degree of acetyl substitution of from about 1.8 to about 3.4, such as from about 2.1 to about 2.8, including all increments of 0.1 therebetween. The degree of substitution of cellulose ester can be measured using ASTM Test 871-96 (2010). In one aspect, the degree of substitution is greater than about 2.2, such as greater than about 2.3, such as greater than about 2.4 and generally less than about 2.9, such as less than about 2.8, such as less than about 2.7, such as less than about 2.6.

The cellulose ester polymer or cellulose acetate can have an intrinsic viscosity of generally greater than about 0.5 dL/g, such as greater than about 0.8 dL/g, such as greater than about 1 dL/g, such as greater than about 1.2 dL/g, such as greater than about 1.4 dL/g, such as greater than about 1.6 dL/g. The intrinsic viscosity is generally less than about 2 dL/g, such as less than about 1.8 dL/g, such as less than about 1.7 dL/g, such as less than about 1.65 dL/g. Intrinsic viscosity may be measured by forming a solution of 0.20 g/dL cellulose ester in 98/2 wt/wt acetone/water and measuring the flow times of the solution and the solvent at 30° C. in a #25 Cannon-Ubbehlode viscometer. Then, the modified Baker-Philippoff equation may be used to determine intrinsic viscosity ("IV"), which for this solvent system is Equation 1.

$$IV = \left(\frac{k}{c}\right)\left(\text{antilog}((\log n_{rel})/k) - 1\right) \quad \text{Equation 1}$$

$$\text{where } n_{rel} = \left(\frac{t_1}{t_2}\right),$$

$t_1$=the average flow time of solution (having cellulose ester) in seconds, $t_2$=the average flow times of solvent in seconds, k=solvent constant (10 for 98/2 wt/wt acetone/water), and c=concentration (0.200 g/d L).

The cellulose ester polymer that is combined with the one or more plasticizers in accordance with the process of the present disclosure is in the form of particles. For instance, the cellulose ester particles can have a round shape, an irregular shape, or can be in the shape of a flake.

As described above, one of the advantages of the process of the present disclosure is the ability to process cellulose ester particles in their "raw" state without having to grind the particles to a smaller size or subject the particles to a drying process. Consequently, in one embodiment, the cellulose ester particles fed into the process are virgin flakes as produced by the cellulose ester polymer process. For example, in one embodiment, greater than about 50% by weight, such as greater than about 60% by weight, such as greater than about 70% by weight of the cellulose ester particles have a particle size of greater than about 850 microns. Particle size can be determined according to a sieve test using standard size sieve screens. For example, particle size can be determined by placing a 200 gram sample of the particles in a RO-TAP AS200 automatic shaker available from Retsch containing different sized sieve screens. The amplitude setting is 1.25 mm/g and the shake time is 15 minutes.

In one aspect, greater than about 20% by weight, such as greater than about 25% by weight, such as greater than about 30% by weight, such as greater than about 40% by weight, such as greater than about 45% by weight of the cellulose ester particles has a particle size of greater than about 2,000 microns. In general, less than about 70% by weight, such as less than about 90% by weight of the particles have a particle size of greater than 2,000 microns. In one aspect, less than 50% by weight, such as less than about 40% by weight, such as less than about 30% by weight, such as less than about 20% by weight have a particle size of less than 500 microns. Some of the particles contained within the cellulose ester can have a particle size of up to about 50,000 microns, such as up to about 30,000 microns, such as up to about 25,000 microns.

When in the shape of a flake, the cellulose ester particles can have an aspect ratio of greater than about 1:4 (thickness to largest dimension), such as greater than about 1:8, such as greater than about 1:12, such as greater than about 1:20, such as greater than about 1:30, such as greater than about 1:40, and generally less than about 1:100, such as less than about 1:50.

Although the cellulose ester particles fed to the process of the present disclosure can have relatively large sizes, in one aspect, the flake or particles can be ground. The particle size of the cellulose ester, for instance, can vary depending upon the particular application and the desired result. In one aspect, the average particle size of the cellulose ester particles can be greater than about 10 microns, such as greater than about 50 microns, such as greater than about 70 microns, such as greater than about 100 microns, such as greater than about 120 microns, such as greater than about 140 microns. The average particle size of the ground cellulose ester particles can be generally less than about 500 microns, such as less than about 400 microns, such as less than about 300 microns, such as less than about 200 microns, such as less than about 160 microns.

The cellulose ester particles fed into the process of the present disclosure can generally have a moisture content of less than about 10%, such as less than about 8%, such as less than about 6%, such as less than about 4%, such as less than about 2%, such as less than about 1%. If desired, the cellulose ester particles can be preheated or dried prior to being fed into the process and contacted with the plasticizer and wetting agent. For example, the cellulose ester particles can be preheated or dried such that the particles contain moisture or water in an amount less than about 2% by weight, such as in an amount less than about 1.5% by weight, such as in an amount less than about 1% by weight, such as in an amount less than about 0.7% by weight. The cellulose ester particles generally contain water in an amount greater than about 0.1% by weight.

The cellulose ester particles can be preheated if desired to a temperature of greater than about 40° C., such as greater than about 50° C., such as greater than about 55° C., such as greater than about 60° C., such as greater than about 70° C., such as greater than about 80° C., and generally less than about 90° C., such as less than about 80° C.

The cellulose ester particles of the present disclosure are fed to a heated extruding device and combined with different and separate quantities of one or more plasticizers as the particles are heated, converted into a molten state, and extruded into a product, such as pellets or strands. Referring to FIG. 1, for instance, one embodiment of a process in accordance with the present disclosure is shown. More particularly, FIG. 1 illustrates a heated extruding device 10 that can be used to combine the cellulose ester particles with one or more plasticizers. As shown, the extruding device 10 is placed in association with a hopper 12 for feeding the cellulose ester particles into the extruding device 10. The cellulose ester particles can be held in a storage container 14 and gravity fed into the extruding device 10. Alternatively, the cellulose ester particles can be subjected to external forces for metering the particles into the extruding device 10.

The heated extruding device 10 can comprise a barrel 16 that can be made up of a plurality of barrel sections. The barrel 16 can be designed to contain one or more extrusion screws disposed axially therein. The extrusion screw may be driven by a screw drive motor.

The barrel 16 can be heated using any suitable heating device or technique. The different barrel sections of the barrel 16 can be configured so that the temperature within each section can be controlled. The temperature within the barrel 16 during processing can generally be greater than about 160° C., such as greater than about 180° C., such as greater than about 200° C., such as greater than about 220° C. The temperature is generally less than about 260° C., such as less than about 250° C., such as less than about 240° C., such as less than about 220° C., such as less than about 200° C. The barrel 16 of the extruding device 10 can have a temperature profile from the first end where the hopper 12 is located to the second end where an extruded product is formed. In one embodiment, the temperature can gradually increase from one end to the other. Alternatively, the temperature can increase and then decrease over the length of the barrel 16.

As shown in FIG. 1, the process includes a plasticizer supply 18 that is in fluid communication with at least two ports located along the length of the barrel 16. The plasticizer supply 18 is for supplying one or more plasticizers to the extruding device 10 for mixing with a cellulose ester polymer being conveyed through the extruding device 10. In the embodiment illustrated in FIG. 1, two injection ports 20 and 22 are shown. It should be understood, however, that the heated extruding device 10 may include more than two plasticizer injection ports. For instance, the extruding device 10 can include three, four, five, six, seven, eight, nine or ten plasticizer injection ports. The number of plasticizer injection ports can vary depending upon the amount of plasticizer being incorporated into the polymer, the type of plasticizer, the temperature of the extruding device 10, the molecular weight of the cellulose ester polymer, and the like.

In accordance with the present disclosure, the cellulose ester particles are fed into the extruding device 10 and heated and then combined with different quantities of plasticizer as the cellulose ester polymer is conveyed through the barrel 16. For example, the cellulose ester polymer can be combined with a first quantity of plasticizer at the first plasticizer injection port 20. Once the cellulose ester polymer has been combined and mixed with the first quantity of plasticizer, a second quantity of plasticizer can then be fed into the extruding device 10 through the second plasticizer injection port 22 for further blending with the cellulose ester polymer.

The amount of plasticizer fed into the extruding device 10 at the first injection port 20 and the amount of plasticizer fed into the extruding device 10 through the second plasticizer injection port 22 can vary in order to optimize homogeneous blending with the polymer. In one aspect, the first quantity of plasticizer is less than the second quantity of plasticizer. In an alternative embodiment, the first quantity of plasticizer can be the same as the second quantity of plasticizer. In still another embodiment, the second quantity of plasticizer can be less than the first quantity of plasticizer.

In one embodiment, the first plasticizer injection port 20 is used to add to the cellulose ester polymer a first plasticizer in an amount from about 2% to about 6% by weight, including all increments of 0.1% by weight therebetween. The second plasticizer injection port 22 can inject a second plasticizer into the extruder 10 in an amount greater than about 2% by weight, such as in an amount greater than about 4% by weight, such as in an amount greater than about 6% by weight, such as in an amount greater than about 8% by weight, such as in an amount greater than about 10% by weight, such as in an amount greater than about 12% by weight, such as in an amount greater than about 14% by weight, such as in an amount greater than about 16% by weight, such as in an amount greater than about 18% by weight, such as in an amount greater than about 20% by weight, such as in an amount greater than about 22% by weight, such as in an amount greater than about 24% by weight, such as in an amount greater than about 26% by weight, based upon the weight of the cellulose ester polymer blend contained within the extruding device. The amount of the second plasticizer injected into the extruding device 10 at the second plasticizer injection port 22 is generally less than about 34% by weight, such as less than about 30% by weight, such as less than about 26% by weight, based upon the weight of the cellulose ester polymer blend contained within the extruding device.

For processes and systems that contain two plasticizer injection ports, the weight ratio between the first plasticizer and the second plasticizer can be, in one aspect, from about 1:1 to about 1:20, such as from about 1:2 to about 1:12, such as from about 1:2 to about 1:7. The first plasticizer can be the same as the second plasticizer. Alternatively, the first plasticizer can be different than the second plasticizer. In still another embodiment, plasticizer blends containing more than one plasticizer can be injected at one or more of the plasticizer injection ports.

In the embodiment illustrated in FIG. 1, the system includes two plasticizer injection ports. As described above, up to ten plasticizer injection ports can be incorporated into the process. Each plasticizer injection port can inject a plasticizer in an amount from about 1% by weight to about 20% by weight, including all increments of 0.5% by weight therebetween based upon the total weight of the final product produced by the process. For example, when containing more than two plasticizer injection ports, the amount of plasticizer incorporated into the plasticized product at each injection port can be greater than about 2% by weight, such as greater than about 4% by weight, such as greater than about 6% by weight, such as greater than about 8% by weight, such as greater than about 10% by weight, such as greater than about 12% by weight, and generally less than about 20% by weight, such as less than about 16% by weight, such as less than about 12% by weight, such as less than about 8% by weight.

In addition to a polysaccharide ester polymer, such as a cellulose ester polymer, and one or more plasticizers, the process of the present disclosure as shown in FIG. 1 is also well suited to incorporating one or more additives into the plasticized and compounded product. For example, as shown in FIG. 1, the process can include an additive supply 24 that can feed an additive to the hopper 12. Additives that can be incorporated into the product include antioxidants, coloring agents, lubricants, softening agents, acid scavengers, antimicrobial agents, preservatives, flame retardants, combinations thereof, and the like. In one embodiment, one or more additives can be pre-compounded with a cellulose ester polymer for producing a cellulose ester polymer and additive masterbatch that is then combined with greater amounts of cellulose ester particles and fed to the heated extruding device 10. In one embodiment, the masterbatch can contain one or more stabilizers, such as antioxidants, light stabilizers, heat stabilizers, and the like.

As shown in FIG. 1, the system can include one or more devolatilization zones 26 that can comprise one or more vents and may optionally be coupled to a vacuum. The devolatilization zones can allow for any volatile matter, including evaporated water, to be released from the extruding device 10. The system and process of the present disclosure, for instance, can include generally from about one to about four devolatilization zones spaced along the length of the barrel 16.

Located at the end of the barrel 16 is a die plate 28 that is designed to create a desired size and shape of the cellulose ester product. For example, in one embodiment, the die plate 34 can be designed to produce strands comprised of the plasticized cellulose ester product. The strands or other shapes can then be fed to a water bath 30 and then to a pelletizing device 32. For example, in one embodiment, strands can be extruded in the process and then cut into pellets at the pelletizing device 32.

Optionally, the pellets can be then fed to a classifier 34 which may also include a metal detection and separation device. From the classifier 34, the pellets can be fed to a storage tote 36 for use in producing molded products in downstream processes. For example, the pellets that are formed can then be used to produce films, fibers, and all different types of molded articles. The pellets, for instance, can be fed to a film forming process, a fiber forming process, an injection molding process, a blow molding process, a thermoforming process, or the like. In one embodiment, the pellets can be fed to a foam forming process for forming a foamed article.

In general, any suitable plasticizer or blend of plasticizers may be combined with the cellulose ester particles during the process.

Plasticizers particularly well suited for use in the process include triacetin, monoacetin, diacetin, and mixtures thereof. Other suitable plasticizers include tris(clorisopropyl) phosphate, tris(2-chloro-1-methylethyl) phosphate, triethyl citrate, acetyl triethyl citrate, glycerin, polyethylene glycol, or mixtures thereof.

Other examples of plasticizers include, but are not limited to, trimethyl phosphate, triethyl phosphate, tributyl phosphate, triphenyl phosphate, acetyl tributyl citrate, tributylo-acetyl citrate, dibutyl tartrate, ethyl o-benzoylbenzoate, n-ethyltoluenesulfonamide, o-cresyl p-toluenesulfonate, aromatic diol, substituted aromatic diols, aromatic ethers, tripropionin, tribenzoin, glycerin, glycerin esters, glycerol tribenzoate, glycerol acetate benzoate, polyethylene glycol esters, polyethylene glycol diesters, di-2-ethylhexyl polyethylene glycol ester, glycerol esters, diethylene glycol, polypropylene glycol, polyglycoldiglycidyl ethers, dimethyl sulfoxide, N-methyl pyrollidinone, propylene carbonate, C1-C20 dicarboxylic acid esters, dimethyl adipate (and other dialkyl esters), di-butyl maleate, di-octyl maleate, resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, alkyl lactones (e.g., .gamma.-valerolactone), alkylphosphate esters, aryl phosphate esters, phospholipids, aromas (including some described herein, e.g., eugenol, cinnamyl alcohol, camphor, methoxy hydroxy acetophenone (acetovanillone), vanillin, and ethylvanillin), 2-phenoxyethanol, glycol ethers, glycol esters, glycol ester ethers, polyglycol ethers, polyglycol esters, ethylene glycol ethers, propylene glycol ethers, ethylene glycol esters (e.g., ethylene glycol diacetate), propylene glycol esters, polypropylene glycol esters, acetylsalicylic acid, acetaminophen, naproxen, imidazole, triethanol amine, benzoic acid, benzyl benzoate, salicylic acid, 4-hydroxybenzoic acid, propyl-4-hydroxybenzoate, methyl hydroxybenzoate, ethyl-4-hydroxybenzoate, benzyl-4-hydroxybenzoate, glyceryl tribenzoate, neopentyl dibenzoate, triethylene glycol dibenzoate, trimethylolethane tribenzoate, butylated hydroxytoluene, butylated hydroxyanisol, sorbitol, xylitol, ethylene diamine, piperidine, piperazine, hexamethylene diamine, triazine, triazole, pyrrole, and the like, any derivative thereof, and any combination thereof.

In one aspect, a carbonate ester may serve as a plasticizer. Exemplary carbonate esters may include, but are not limited to, propylene carbonate, butylene carbonate, diphenyl carbonate, phenyl methyl carbonate, dicresyl carbonate, glycerin carbonate, dimethyl carbonate, diethyl carbonate, ethylene carbonate, propylene carbonate, isopropylphenyl 2-ethylhexyl carbonate, phenyl 2-ethylhexyl carbonate, isopropylphenyl isodecyl carbonate, isopropylphenyl tridecyl carbonate, phenyl tridecyl carbonate, and the like, and any combination thereof.

In still another aspect, the plasticizer can be a polyol benzoate. Exemplary polyol benzoates may include, but are not limited to, glyceryl tribenzoate, propylene glycol dibenzoate, diethylene glycol dibenzoate, dipropylene glycol dibenzoate, triethylene glycol dibenzoate, sucrose benzoate, polyethylene glycol dibenzoate, neopentylglycol dibenzoate, trimethylolpropane tribenzoate, trimethylolethane tribenzoate, pentaerythritol tetrabenzoate, sucrose benzoate (with a degree of substitution of 1-8), and combinations thereof. In some instances, tribenzoates like glyceryl tribenzoate may be preferred. In some instances, polyol benzoates may be solids at 25° C. and a water solubility of less than 0.05 g/100 mL at 25° C.

The plasticizer can also be bio-based. Bio-based plasticizers particularly well suited for use in the composition of the present disclosure include an alkyl ketal ester, a non-petroleum hydrocarbon ester, a bio-based polymer or oligomer, such as polycaprolactone, having a number average molecular weight of 1000 or less, or mixtures thereof.

In one aspect, the bio-based plasticizer is an alkyl ketal ester having a chemical structure corresponding to Structure I as provided below:

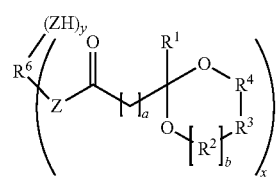

wherein a is from 0 to 12; b is 0 or 1; each $R^1$ is independently hydrogen, a hydrocarbyl group, or a substituted hydrocarbyl group; each $R^2$, $R^3$, and $R^4$ are independently methylene, alkylmethylene, or dialkylmethylene, x is at least 1, y is 0 or a positive number and x+y is at least 2; $R^6$ is a hydrocarbyl group or a substituted hydrocarbyl group and each Z is independently —O—, —NH— or —NR— where R is a hydrocarbyl group or a substituted hydrocarbyl group.

The plasticizer identified above corresponds to a reaction product of a polyol, aminoalcohol or polyamine and certain 1,2- and/or 1,3-alkanediol ketal of an oxocarboxylate esters. 1,2- and 1,3-alkanediols ketals of oxocarboxylate esters are referred to herein as "alkyl ketal esters". Up to one mole of alkyl ketal ester can be reacted per equivalent of hydroxyl groups or amino groups provided by the polyol, aminoalcohol or polyamine. The polyol, aminoalcohol or polyamine is most preferably difunctional, but polyols, aminoalcohols and polyamines having more than two hydroxyl and/or amino groups can be used.

The values of x and y in structure I will depend on the number of hydroxyl groups or amino groups on the polyol, aminoalcohol or polyamine, the number of moles of the alkyl ketal ester per mole of the polyol, aminoalcohol or polyamine, and the extent to which the reaction is taken towards completion. Higher amounts of the alkyl ketal ester favor lower values for y and higher values of x.

In structure I, y is specifically from 0 to 2 and x is specifically at least 2. All a in structure I are specifically 2 to 12, more specifically, 2 to 10, more specifically, 2 to 8, more specifically, 2 to 6, more specifically, 2 to 4, and more specifically, 2. All $R^1$ are specifically an alkyl group, specifically methyl. In some embodiments of structure I, all Z are –O—, y is 0 and x is 2; these products correspond to a reaction of two moles of an alkyl ketal ester and one mole of a diol. In some other embodiments, all Z are –O—, y is 1 and x is 1; these products correspond to the reaction of one mole of the alkyl ketal ester and one mole of a diol.

In one embodiment, all b are 0. In another embodiment, all b are 1.

Some specific compounds according to structure I include those having the structure:

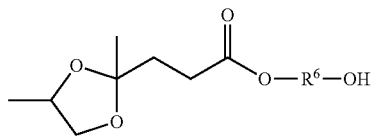

or the structure

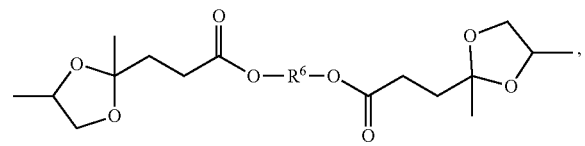

or the structure

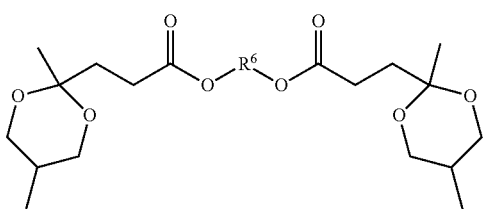

particularly in which $R^6$ is —$(CH_2)$—$_m$ wherein m is from 2 to 18, especially 2, 3, 4 or 6. In one specific embodiment, $R^6$ corresponds to the residue, after removal of hydroxyl groups, of 1,4-butane diol resulting in the structure (Ia)

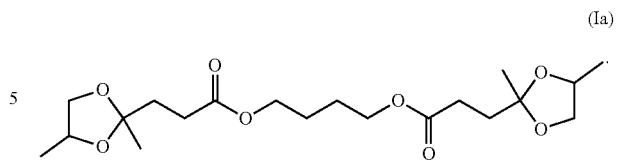

(Ia)

In another specific embodiment, $R^6$ corresponds to the residue, after removal of hydroxyl groups, of diethylene glycol resulting in structure (Ib)

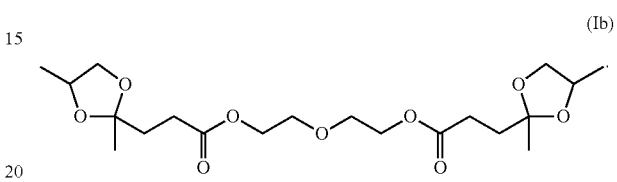

(Ib)

In another specific embodiment, $R^6$ corresponds to the residue, after removal of hydroxyl groups, of 2-methyl. 1-3 propane diol resulting in structure (Ic)

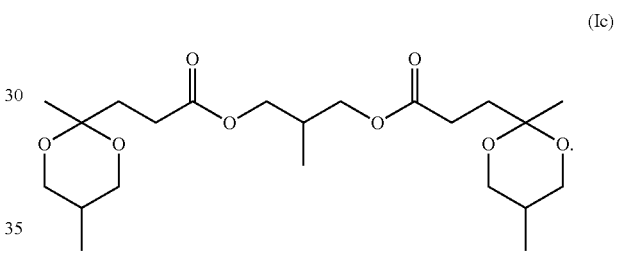

(Ic)

Compounds according to structure I can be prepared in a transesterification or ester-aminolysis reaction between the corresponding polyol, aminoalcohol or polyamine and the corresponding alkyl ketal ester. Alternatively, compounds according to structure I can be prepared by reacting an oxocarboxylic acid with the polyol, aminoalcohol or polyamine to form an ester or amide, and then ketalizing the resulting product with a 1,2- or 1,3-alkane diol such as ethylene glycol, 1,2-propanediol, 1,3-propanediol, 2-methyl, 1-3 propane diol, 1,2-butanediol, 1,3-butanediol, 1,2-pentanediol, 1,3-pentanediol, 1,2-hexanediol, 1,3-hexanediol, and the like.

Another bio-based plasticizer that may be incorporated into the polymer composition of the present disclosure is a non-petroleum hydrocarbon ester. For example, one example of a non-petroleum hydrocarbon ester is sold under the tradename HALLGREEN by the Hall Star Company of Chicago, Illinois Non-petroleum hydrocarbon ester plasticizers, for instance, can contain greater than about 50% by weight, such as greater than about 70% by weight, such as greater than about 99% by weight of bio-based content. The esters, for instance, can be derived primarily from agricultural, forestry, or marine materials and thus are biodegradable. In one aspect, the non-petroleum hydrocarbon ester plasticizer has a specific gravity at 25° C. of about 1.16 or greater, such as about 1.165 or greater, such as about 1.17 or greater, such as about 1.74 or greater, and generally about 1.19 or less, such as about 1.185 or less, such as about 1.18 or less, such as about 1.78 or less. The non-petroleum hydrocarbon ester plasticizer can have an acid value of from about 0.5 mgKOH/g to about 0.6 mgKOH/g, such as from about 0.53 mgKOH/g to about 0.57 mgKOH/g.

In one aspect, the plasticizer is phthalate-free. In fact, the polymer composition and product can be formulated to be phthalate-free. For instance, phthalates can be present in the polymer composition and/or product in an amount of about 0.5% or less, such as in an amount of about 0.1% or less.

The amount of cellulose ester and the amount of plasticizer that are combined together can vary depending upon the particular application.

The cellulose acetate is generally present in the polymer composition or product in an amount greater than about 15% by weight, such as in an amount greater than about 25% by weight, such as in an amount greater than about 35% by weight, such as in an amount greater than about 45% by weight, such as in an amount greater than about 55% by weight. The cellulose acetate is generally present in the polymer composition in an amount less than about 95% by weight, such as in an amount less than about 85% by weight, such as in an amount less than about 75% by weight, such as in an amount less than about 70% by weight, such as in an amount less than about 65% by weight.

In general, one or more plasticizers can be present in the polymer composition or product in an amount from about 8% to about 40% by weight, such as in an amount from about 12% to about 35% by weight. In one embodiment, relatively large amounts of plasticizer are incorporated into the product, such as in an amount from about 18% by weight to about 32% by weight, such as from about 20% by weight to about 26% by weight. In another aspect, the amount of plasticizer is relatively low. For example, one or more plasticizers can be present in the polymer composition in an amount of about 17% or less, such as in an amount of about 15% or less, such as in an amount of about 12% or less, such as in an amount of about 10% or less, such as in an amount of about 8% or less.

The cellulose acetate can be present in relation to the plasticizer such that the weight ratio between the cellulose acetate and the one or more plasticizers is from about 60:40 to about 85:15, such as from about 70:30 to about 80:20. In one embodiment, the cellulose acetate to plasticizer weight ratio is about 75:25.

As described above, in addition to the cellulose ester polymer and one or more plasticizers, the plasticized cellulose ester product of the present disclosure can also contain various other additives and ingredients as described above. These additives and ingredients can be incorporated into the product during formation of the pellets. Alternatively, these additives and ingredients can be incorporated into the downstream molding process for incorporation into the final product being formed.

For instance, the polymer composition may contain antioxidants, pigments, lubricants, softening agents, acid scavengers, antibacterial agents, antifungal agents, preservatives, flame retardants, and combinations thereof. Each of the above additives can generally be present in the polymer composition in an amount of about 5% or less, such as in an amount of about 2% or less, and generally in an amount of about 0.1% or greater, such as in an amount of about 0.3% or greater.

Flame retardants suitable for use in conjunction with a cellulose ester plastic described herein may, in some embodiments, include, but are not limited to, silica, metal oxides, phosphates, catechol phosphates, resorcinol phosphates, borates, inorganic hydrates, aromatic polyhalides, and the like, and any combination thereof.

Antifungal and/or antibacterial agents suitable for use in conjunction with a cellulose ester plastic described herein may, in some embodiments, include, but are not limited to, polyene antifungals (e.g., natamycin, rimocidin, filipin, nystatin, amphotericin B, candicin, and hamycin), imidazole antifungals such as miconazole (available as MICATIN® from WellSpring Pharmaceutical Corporation), ketoconazole (commercially available as NIZORAL® from McNeil consumer Healthcare), clotrimazole (commercially available as LOTRAMIN® and LOTRAMIN AF® available from Merck and CANESTEN® available from Bayer), econazole, omoconazole, bifonazole, butoconazole, fenticonazole, isoconazole, oxiconazole, sertaconazole (commercially available as ERTACZO® from OrthoDematologics), sulconazole, and tioconazole; triazole antifungals such as fluconazole, itraconazole, isavuconazole, ravuconazole, posaconazole, voriconazole, terconazole, and albaconazole), thiazole antifungals (e.g., abafungin), allylamine antifungals (e.g., terbinafine (commercially available as LAMISIL® from Novartis Consumer Health, Inc.), naftifine (commercially available as NAFTIN® available from Merz Pharmaceuticals), and butenafine (commercially available as LOTRAMIN ULTRA® from Merck), echinocandin antifungals (e.g., anidulafungin, caspofungin, and micafungin), polygodial, benzoic acid, ciclopirox, tolnaftate (e.g., commercially available as TINACTIN® from MDS Consumer Care, Inc.), undecylenic acid, flucytosine, 5-fluorocytosine, griseofulvin, haloprogin, caprylic acid, and any combination thereof.

Preservatives suitable for use in conjunction with a cellulose ester plastic described herein may, in some embodiments, include, but are not limited to, benzoates, parabens (e.g., the propyl-4-hydroxybenzoate series), and the like, and any combination thereof.

Pigments and dyes suitable for use in conjunction with a cellulose ester plastic described herein may, in some embodiments, include, but are not limited to, plant dyes, vegetable dyes, titanium dioxide, silicon dioxide, tartrazine, E102, phthalocyanine blue, phthalocyanine green, quinacridones, perylene tetracarboxylic acid di-imides, dioxazines, perinones disazo pigments, anthraquinone pigments, carbon black, metal powders, iron oxide, ultramarine, calcium carbonate, kaolin clay, aluminum hydroxide, barium sulfate, zinc oxide, aluminum oxide, CARTASOL® dyes (cationic dyes, available from Clariant Services) in liquid and/or granular form (e.g., CARTASOL® Brilliant Yellow K-6G liquid, CARTASOL® Yellow K-4GL liquid, CARTASOL® Yellow K-GL liquid, CARTASOL® Orange K-3GL liquid, CARTASOL® Scarlet K-2GL liquid, CARTASOL® Red K-3BN liquid, CARTASOL® Blue K-5R liquid, CARTASOL® Blue K-RL liquid, CARTASOL® Turquoise K-RL liquid/granules, CARTASOL® Brown K-BL liquid), FASTUSOL® dyes (an auxochrome, available from BASF) (e.g., Yellow 3GL, Fastusol C Blue 74L), and the like, any derivative thereof, and any combination thereof.

In some embodiments, pigments and dyes suitable for use in conjunction with a cellulose ester plastic described herein may be food-grade pigments and dyes. Examples of food-grade pigments and dyes may, in some embodiments, include, but are not limited to, plant dyes, vegetable dyes, titanium dioxide, and the like, and any combination thereof.

Antioxidants may, in some embodiments, mitigate oxidation and/or chemical degradation of a cellulose ester plastic described herein during storage, transportation, and/or implementation. Antioxidants suitable for use in conjunction with a cellulose ester plastic described herein may, in some embodiments, include, but are not limited to, anthocyanin, ascorbic acid, glutathione, lipoic acid, uric acid, resveratrol, flavonoids, carotenes (e.g., beta-carotene), carotenoids, tocopherols (e.g., alpha-tocopherol, beta-tocopherol, gamma-tocopherol, and delta-tocopherol), tocotrienols, tocopherol esters (e.g., tocopherol acetate), ubiquinol, gallic acids, melatonin, secondary aromatic amines, benzofuranones, hindered phenols, polyphenols, hindered amines, organophosphorus compounds, thioesters, benzoates, lactones, hydroxylamines, butylated hydroxytoluene ("BHT"), butylated hydroxyanisole ("BHA"), hydroquinone, and the like, and any combination thereof.

In some embodiments, antioxidants suitable for use in conjunction with a cellulose ester plastic described herein may be food-grade antioxidants. Examples of food-grade antioxidants may, in some embodiments, include, but are not limited to, ascorbic acid, vitamin A, tocopherols, tocopherol esters, beta-carotene, flavonoids, BHT, BHA, hydroquinone, and the like, and any combination thereof.

EXAMPLES

The following examples were conducted in order to demonstrate some of the advantages and benefits of the present disclosure.

Example No. 1

Cellulose acetate flake and plasticizer were combined in an extruder similar to the process illustrated in FIG. 1 and described above. The plasticizer was triacetin and was added at two different locations along the extruder. The final compositions were then tested for mechanical properties and the following results were obtained. During the process, some plasticizer was liberated during the process.

The following tests were conducted on the compositions (using the most recent edition of the standardized test):

| | |
|---|---|
| Tensile Stress at break and Tensile Modulus, 50 mm/min (MPa) | ISO 527 |
| Tensile Strain at break, 50 mm/min (%) | ISO 527 |
| Flexural Modulus and Flexural Strength, 23° C. (MPa) | ISO 178 |
| Charpy Notched Impact strength, 23° C. (kJ/m^2) | ISO 179 |
| DTUL @ 1.8 or 0.45 MPa (° C.) | ASTM D648 |

The following samples were produced. The table below lists the amount of plasticizer ("Pz") added at a first location. An additional amount of plasticizer was added at a second downstream location to produce a final plasticizer loading.

| Sample No. | Pz amount 1st Location | Pz Total Loading |
|---|---|---|
| 1 | 3 | 25 |
| 2 | 7 | 25 |
| 3 | 3 | 25 |
| 4 | 7 | 25 |
| 5 | 3 | 29 |
| 6 | 7 | 29 |
| 7 | 3 | 29 |
| 8 | 7 | 29 |
| 9 | 5 | 27 |
| 10 | 5 | 27 |
| 11 | 5 | 27 |

The samples were then subjected to the gel analysis test and the following results were obtained.

| Sample No. | Total Defect Area (mm$^2$) | Gel 75 micron (1/m$^2$) | Gel 100 micron (1/m$^2$) | Gel 200 micron (1/m$^2$) | Gel 300 micron (1/m$^2$) | Gel 400 micron (1/m$^2$) | Gel > 400 micron (1/m$^2$) |
|---|---|---|---|---|---|---|---|
| 1 | 675 | 23159 | 32164 | 20163 | 1499 | 241 | 193 |
| 2 | 1384 | 25104 | 31314 | 25310 | 2258 | 281 | 1020 |
| 3 | 783 | 29299 | 40414 | 26403 | 1868 | 96 | 19 |
| 4 | 978 | 27692 | 39756 | 25751 | 1699 | 200 | 540 |
| 5 | 722 | 32864 | 44881 | 22548 | 1140 | 76 | 36 |
| 6 | 13000 | 109526 | 93214 | 63520 | 8771 | 2173 | 1465 |
| 7 | 887 | 36052 | 46183 | 27922 | 1599 | 105 | 139 |
| 8 | 994 | 37113 | 51118 | 28966 | 1986 | 144 | 234 |
| 9 | 670 | 23101 | 28991 | 22648 | 1950 | 146 | 47 |
| 10 | 939 | 40912 | 50192 | 24092 | 2100 | 430 | 289 |
| 11 | 548 | 21529 | 27704 | 17740 | 1420 | 99 | 25 |

The following are the results of various physical properties.

| Sample No. | MFR (g/10 min) | Tensile Modulus (MPa) | Tensile Str @brk (MPa) | Tensile strain @ break (%) | Flex Modulus (MPa) | Flex Stress (MPa) |
|---|---|---|---|---|---|---|
| 1 | 2.2 | 2914.2 | 51.72 | 10.188 | 3288 | 70.64 |
| 2 | 1.7 | 2847.2 | 50.694 | 6.1175 | 3293 | 71.02 |
| 3 | 2.1 | 2983.8 | 52.574 | 9.8175 | 3278 | 69.86 |
| 4 | 2.5 | 2723 | 47.526 | 8.61 | 3068 | 63.66 |
| 5 | 4.9 | 2311.8 | 37.52 | 13.124 | 2396 | 50.36 |
| 6 | 12.1 | 1941.2 | 25.942 | 12.862 | 2042 | 41.98 |
| 7 | 10 | 2153.25 | 28.838 | 14.543 | 2169 | 42.95 |
| 8 | 3.3 | 2499.25 | 43.43 | 11.062 | 2814 | 58.64 |
| 9 | 3.5 | 2640.8 | 46.98 | 11.082 | 2958 | 62.29 |
| 10 | 2.7 | 2283 | 33.68 | 11.08 | 2439 | 53.84 |
| 11 | 3.4 | 2460 | 43.21 | 12.17 | 2719 | 56.77 |

| Sample No. | Charpy Un-notched (kJ/m2) | Charpy Notched (kJ/m2) | DTUL 1.8 MPa ° C. | DTUL 0.45 MPa ° C. |
|---|---|---|---|---|
| 1 | 134.1 | 8.2 | 62 | 77.5 |
| 2 | 75.5 | 8.5 | 60 | 82.5 |
| 3 | 128.9 | 7.8 | 61.9 | 74.8 |

-continued

| | | | |
|---|---|---|---|
| 4 | 118.3 | 9.7 | 60 | 74.6 |
| 5 | 127.6 | 12 | 51.9 | 60 |
| 6 | 50.3 | 12.4 | 49 | 56.3 |
| 7 | 119.3 | 13.5 | 49 | 56.4 |
| 8 | 122.4 | 9.7 | 52.5 | 59.7 |
| 9 | 131.2 | 8 | 57.8 | 71.1 |
| 10 | 149.1 | 9 | 55.4 | 70 |
| 11 | 125.3 | 10.1 | 53.1 | 70.9 |

Example No. 2

Cellulose acetate flake and plasticizer were combined in an extruder similar to the process described in Example No. 1. The following samples were formulated.

| Sample No. | Acetyl Value of Cellulose Acetate | Plasticizer 1st Inj. % | Total Plasticizer Loading % | Plasticizer Content in Final % | Tensile Mod MPa | Tensile Str MPa | Strain @ brk % | Flex Mod MPa | Flex Str MPa | Charpy Notched kJ/m2 | DTUL 0.45 Mpa ° C. |
|---|---|---|---|---|---|---|---|---|---|---|---|
| 12 | AV 55.75 | 4 | 26 | 22.84 | 2421 | 41.72 | 11.84 | 2823 | 61.91 | 7.5 | 73.5 |
| 13 | AV 55.45 | 4 | 26 | 22.82 | 2580 | 45.42 | 10.98 | 2922 | 65.29 | 5.2 | 74.4 |
| 14 | AV 55.45 | 4 | 24 | 20.36 | 2832 | 52.42 | 9.91 | 3113 | 68.73 | 6 | 80.9 |
| 15 | AV 55.45 | 4 | 22 | 18.76 | 3021 | 56.11 | 8.6 | 3320 | 74.52 | 4.4 | 89.1 |
| 16 | AV 55.45 | 4 | 20 | 17.41 | 3041 | 67.01 | 9.54 | 3558 | 81.73 | 3.9 | 93.9 |

Sample Nos. 12 through 16 above were then subjected to the gel analysis test and compared to a control sample where all of the plasticizer was added at once. The following results were obtained.

| Sample No. | Total Defect Area (mm²) | Absolute 75 um (1/m²) | Absolute 100 um (1/m²) | Absolute 200 um (1/m²) | Absolute 300 um (1/m²) | Absolute 400 um (1/m²) | Absolute > 400 um (1/m²) |
|---|---|---|---|---|---|---|---|
| Control | 1693 | 39486 | 61783 | 58082 | 6199 | 467 | 116 |
| 12 | 534 | 16779 | 19365 | 15776 | 1647 | 327 | 192 |
| 13 | 829 | 26292 | 33972 | 28247 | 2345 | 277 | 109 |
| 14 | 751 | 22672 | 29685 | 26137 | 2239 | 196 | 72 |
| 15 | 786 | 27735 | 40724 | 26085 | 1693 | 146 | 77 |
| 16 | 783 | 25712 | 36347 | 25740 | 1962 | 183 | 114 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed:

1. A process for producing a polysaccharide ester polymer product comprising:
   feeding polysaccharide ester polymer particles into a heated extruding device, the heated extruding device defining a heated barrel having a length;
   after the polysaccharide ester polymer particles have been heated, combining the polysaccharide ester particles with a first quantity of a first plasticizer within the heated extruding device to form a polysaccharide ester polymer and first plasticizer blend;
   combining the polysaccharide ester polymer particles and first plasticizer blend with a second quantity of a second plasticizer in the heated extruding device downstream from where the polysaccharide ester polymer particles were combined with the first plasticizer; and
   discharging a plasticized polysaccharide ester polymer product from the heated extruding device;
   wherein the first plasticizer is added to the plasticized polysaccharide ester polymer product in relation to the second plasticizer at a weight ratio of from about 1:2 to about 1:12.

2. A process as defined in claim 1, wherein the first plasticizer and the second plasticizer are the same.

3. A process as defined in claim 1, wherein the first plasticizer is a different plasticizer than the second plasticizer.

4. A process as defined in claim 1, wherein the polysaccharide ester polymer comprises a cellulose ester polymer.

5. A process as defined in claim 1, wherein a total amount of plasticizer contained in the plasticized polysaccharide ester polymer product is greater than about 18% by weight and less than about 40% by weight.

6. A process as defined in claim 1, wherein the polysaccharide ester polymer particles are in the form of flakes or a granulated flake.

7. A process as defined in claim 1, wherein greater than about 50% by weight of the polysaccharide ester polymer particles have a particle size of greater than 850 microns when measured according to a sieve test.

8. A process as defined in claim 1, wherein the polysaccharide ester polymer particles have not been ground.

9. A process as defined in claim 1, wherein the plasticizer is preheated prior to contact with the polysaccharide ester polymer particles.

10. A process as defined in claim 1, wherein the polysaccharide ester polymer and plasticizer are melt processed into pellets or strands.

11. A process as defined in claim 1, wherein the first plasticizer and the second plasticizer comprise tris(clorisopropyl) phosphate, tris(2-chloro-1-methylethyl) phosphate, glycerin, monoacetin, triethyl citrate, acetyl triethyl citrate, a phthalate, an adipate, polyethylene glycol, triacetin, diacetin, trimethyl phosphate, triethyl phosphate, tributyl phosphate, triphenyl phosphate, tributyl-o-acetyl citrate, dibutyl tartrate, ethyl o-benzoylbenzoate, n-ethyltoluenesulfonamide, o-cresyl p-toluenesulfonate, aromatic diol, a substituted aromatic diol, an aromatic ether, tripropionin, tribenzoin, glycerin esters, glycerol tribenzoate, glycerol acetate benzoate, polyethylene glycol, a polyethylene glycol ester, a polyethylene glycol diester, di-2-ethylhexyl polyethylene glycol ester, a glycerol ester, diethylene glycol, polypropylene glycol, a polyglycoldiglycidyl ether, dimethyl sulfoxide, N-methyl pyrollidinone, propylene carbonate, a C1-C20 dicarboxylic acid ester, di-butyl maleate, di-octyl maleate, resorcinol monoacetate, catechol, catechol esters, phenols, epoxidized soy bean oil, castor oil, linseed oil, epoxidized linseed oil, difunctional glycidyl ether based on polyethylene glycol, an alkyl lactone, a phospholipid, 2-phenoxyethanol, acetylsalicylic acid, acetaminophen, naproxen, imidazole, triethanol amine, benzoic acid, benzyl benzoate, salicylic acid, 4-hydroxybenzoic acid, propyl-4-hydroxybenzoate, methyl-4-hydroxybenzoate, ethyl-4-hydroxybenzoate, benzyl-4-hydroxybenzoate, glyceryl tribenzoate, neopentyl dibenzoate, triethylene glycol dibenzoate, trimethylolethane tribenzoate, butylated hydroxytoluene, butylated hydroxyanisol, sorbitol, xylitol, ethylene diamine, piperidine, piperazine, hexamethylene diamine, triazine, triazole, pyrrole, or mixtures thereof.

12. A process as defined in claim 1, wherein the first plasticizer and the second plasticizer comprise one or more of triacetin and polyethylene glycol.

13. A process as defined in claim 1, wherein the polysaccharide ester polymer comprises primarily cellulose diacetate.

14. A process as defined in claim 1, wherein the polysaccharide ester polymer product further comprises at least one additive, the at least one additive comprising an antioxidant, a stabilizer, an organic acid, an oil, filler particles, glass fibers, a pigment, a bio-based polymer other than the cellulose ester, a biodegradable enhancer, or mixtures thereof.

15. A process as defined in claim 14, wherein the at least one additive is compounded with the polysaccharide ester polymer to form a masterbatch and wherein the masterbatch is fed to the heated extruding device in combination with the polysaccharide ester polymer particles.

16. A process as defined in claim 1, wherein the polysaccharide ester polymer product further comprises a mineral filler, the mineral filler comprising talc, calcium carbonate, a metal oxide, mica, or mixtures thereof.

17. A process as defined in claim 1, wherein the polysaccharide ester polymer product further comprises a coloring agent, the coloring agent comprising an organic dye, an inorganic dye, a pigment, or mixtures thereof.

18. A process as defined in claim 1, wherein the polysaccharide ester polymer particles are fed to the heated extruding device with a moisture content of less than about 8% by weight.

19. A process as defined in claim 1, wherein a third quantity of a third plasticizer is fed to the heated extruding device downstream from the second plasticizer.

20. The process as defined in claim 1, wherein the first plasticizer is added to the plasticized polysaccharide ester polymer product in relation to the second plasticizer at a weight ratio of from about 1:2 to about 1:7.

* * * * *